US009162446B2

United States Patent
Shuta et al.

(10) Patent No.: US 9,162,446 B2
(45) Date of Patent: Oct. 20, 2015

(54) RECORDING APPARATUS AND RECORDING APPARATUS CONTROL METHOD

(71) Applicants: Tomohiro Shuta, Kanagawa (JP); Jun Watanabe, Tokyo (JP); Tetsuyoshi Nakata, Kanagawa (JP); Hideaki Iijima, Kanagawa (JP); Yuya Mori, Kanagawa (JP); Toshiaki Hosokawa, Kanagawa (JP)

(72) Inventors: Tomohiro Shuta, Kanagawa (JP); Jun Watanabe, Tokyo (JP); Tetsuyoshi Nakata, Kanagawa (JP); Hideaki Iijima, Kanagawa (JP); Yuya Mori, Kanagawa (JP); Toshiaki Hosokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/203,685

(22) Filed: Mar. 11, 2014

(65) Prior Publication Data

US 2014/0268388 A1 Sep. 18, 2014

(30) Foreign Application Priority Data

Mar. 15, 2013 (JP) ................................. 2013-053107

(51) Int. Cl.
*B41J 29/38* (2006.01)
*B41J 2/045* (2006.01)
*G06K 15/02* (2006.01)

(52) U.S. Cl.
CPC .......... *B41J 2/04581* (2013.01); *B41J 2/04541* (2013.01); *G06K 15/1894* (2013.01)

(58) Field of Classification Search
USPC ................. 347/5, 9, 10, 12, 15, 19; 360/31
See application file for complete search history.

(56) References Cited

U.S. PATENT DOCUMENTS

| | | | | |
|---|---|---|---|---|
| 6,273,539 | B1 * | 8/2001 | Suzuki | 347/12 |
| 8,128,186 | B2 * | 3/2012 | Bauman | 347/19 |
| 2002/0036668 | A1 * | 3/2002 | Matsumoto et al. | 347/19 |
| 2009/0289975 | A1 * | 11/2009 | Yoshida | 347/10 |

FOREIGN PATENT DOCUMENTS

| | | |
|---|---|---|
| JP | 5-278267 | 10/1993 |
| JP | 8-267822 | 10/1996 |
| JP | 2010-120181 | 6/2010 |

* cited by examiner

*Primary Examiner* — Lam Nguyen
(74) *Attorney, Agent, or Firm* — Oblon, McClelland, Maier & Neustadt, L.L.P.

(57) ABSTRACT

A recording apparatus includes a head unit, which includes a driver, and a recording data transmitter that transfers recording data to the head unit via a signal line. The recording apparatus further includes a switching unit in the head unit that switches a driving signal applied to the driver between conductive and nonconductive states based on the transferred recording data, a partition signal output unit in the recording data transmitter that outputs a partition signal that partitions a data signal of the recording data to the head unit in response to switching by the switching unit, and a data selector in the head unit that selects data to be discarded from the transferred recording data based on the partition signal.

9 Claims, 7 Drawing Sheets

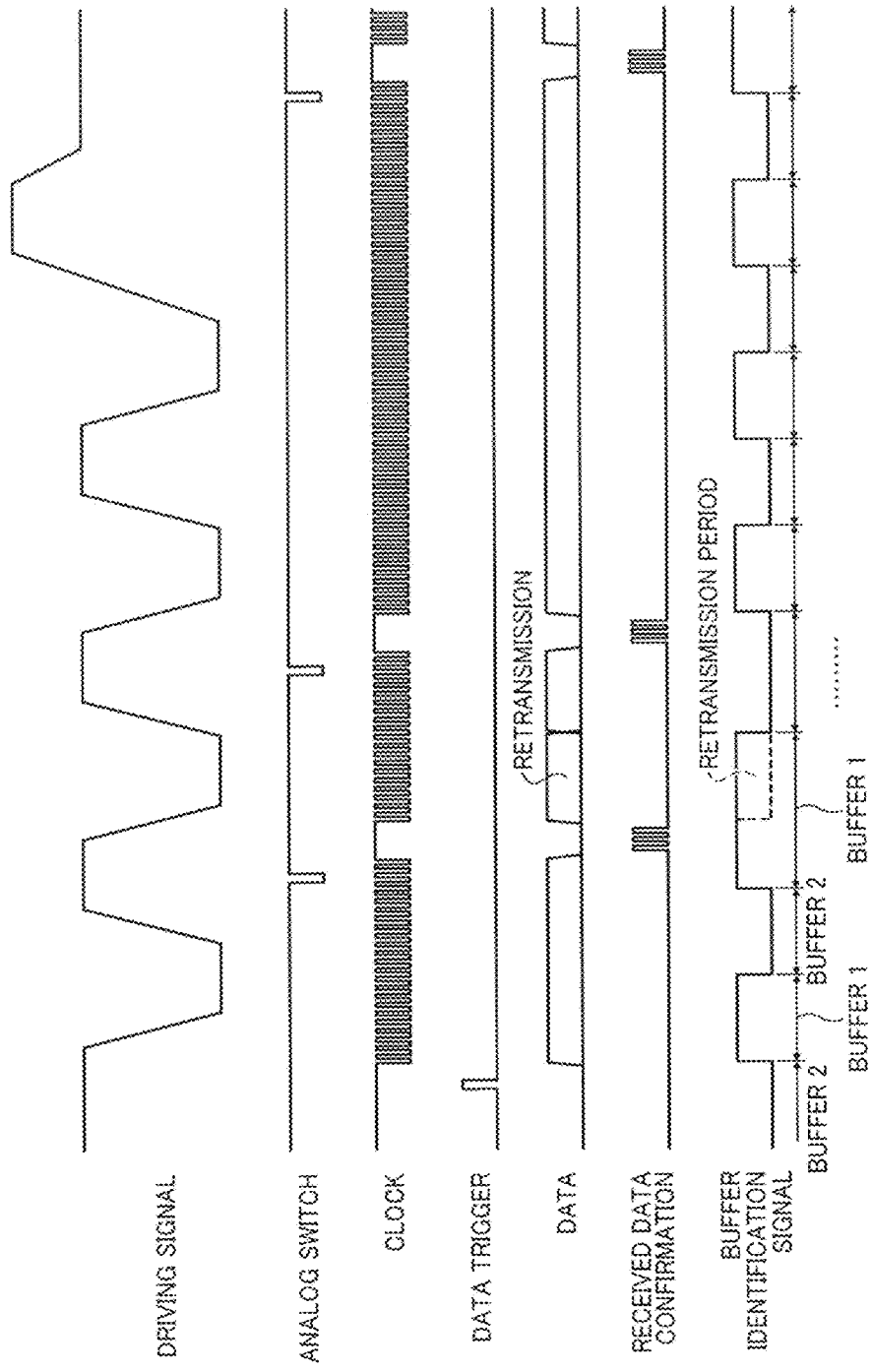

RECORDING APPARATUS AND RECORDING APPARATUS CONTROL METHOD

CROSS-REFERENCE TO RELATED APPLICATION

This patent application is based on and claims priority pursuant to 35 U.S.C. §119(a) to Japanese Patent Application No. 2013-053107, filed on Mar. 15, 2013 in the Japan Patent Office, the entire disclosure of which is hereby incorporated by reference herein.

BACKGROUND

1. Technical Field

The present invention relates to a recording apparatus and a recording apparatus control method.

2. Background Art

In inkjet printing systems that use a piezoelectric device as a driving unit, a voltage in the form of a driving waveform is applied to the piezoelectric device to deform the piezoelectric device and thereby change the capacity of an ink channel to discharge ink droplets from nozzles in a print head. The driving waveform is selected from among a plurality of driving waveforms each consisting of multiple driving pulses and applied to the piezoelectric device by switching a switching circuit between conductive and nonconductive states according to image gradation data. Consequently, the timing and size of the ink droplets discharged from the nozzles in the print head can be controlled in multiple stages.

A problem arises in that noise is generated in the power supply voltage and ground due to the operation of the switching circuit in the print head. In addition, since signal lines are laid out close to each other in flat flexible cables, wire noise can be generated easily. Noise affects the bit values of transferred recording data, because the driving pulses are relatively high-voltage pulses, e.g., from 30V to 50V. As a result, corrupted bit values produce such problems as the discharge of ink droplets of the wrong size or at the wrong time.

To cope with these problems, for example, a technology that uses a printing data stop control unit to control a printing data transmission unit to temporarily stop the transmission of data and a clock based on a switching signal that determines the timing of turning on/off a switching circuit located on the recording head side, and also determines the timing of switching between driving pulses has been proposed (e.g., JP-2010-120181-A).

SUMMARY

An example embodiment of the present invention provides a recording apparatus that includes a head unit, which includes a driver, and a recording data transmitter that transfers recording data to the head unit via a signal line. The recording apparatus further includes a switching unit in the head unit that switches a driving signal applied to the driver between conductive and nonconductive states based on the transferred recording data, a partition signal output unit in the recording data transmitter that outputs a partition signal that partitions a data signal of the recording data to the head unit in response to switching by the switching unit, and a data selector in the head unit that selects data to be discarded from the transferred recording data based on the partition signal.

Example embodiments of the present invention include a recording apparatus control method executed by a recording apparatus that includes a head unit that includes a head unit, which includes a driver, and a recording data transmitter that transfers recording data to the head unit via a signal line. The method includes the steps of switching a driving signal applied to the driver between conductive and nonconductive states based on the transferred recording data using the head unit, outputting from the recording data transmitter a partition signal that partitions a data signal of the recording data to the head unit in response to switching by the switching unit, and selecting data to be discarded from the transferred recording data based on the partition signal using the head unit.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 7 is a timing chart illustrating various signals in a head unit and a recording head controller as the second embodiment of the present invention.

DETAILED DESCRIPTION

Figure 1:
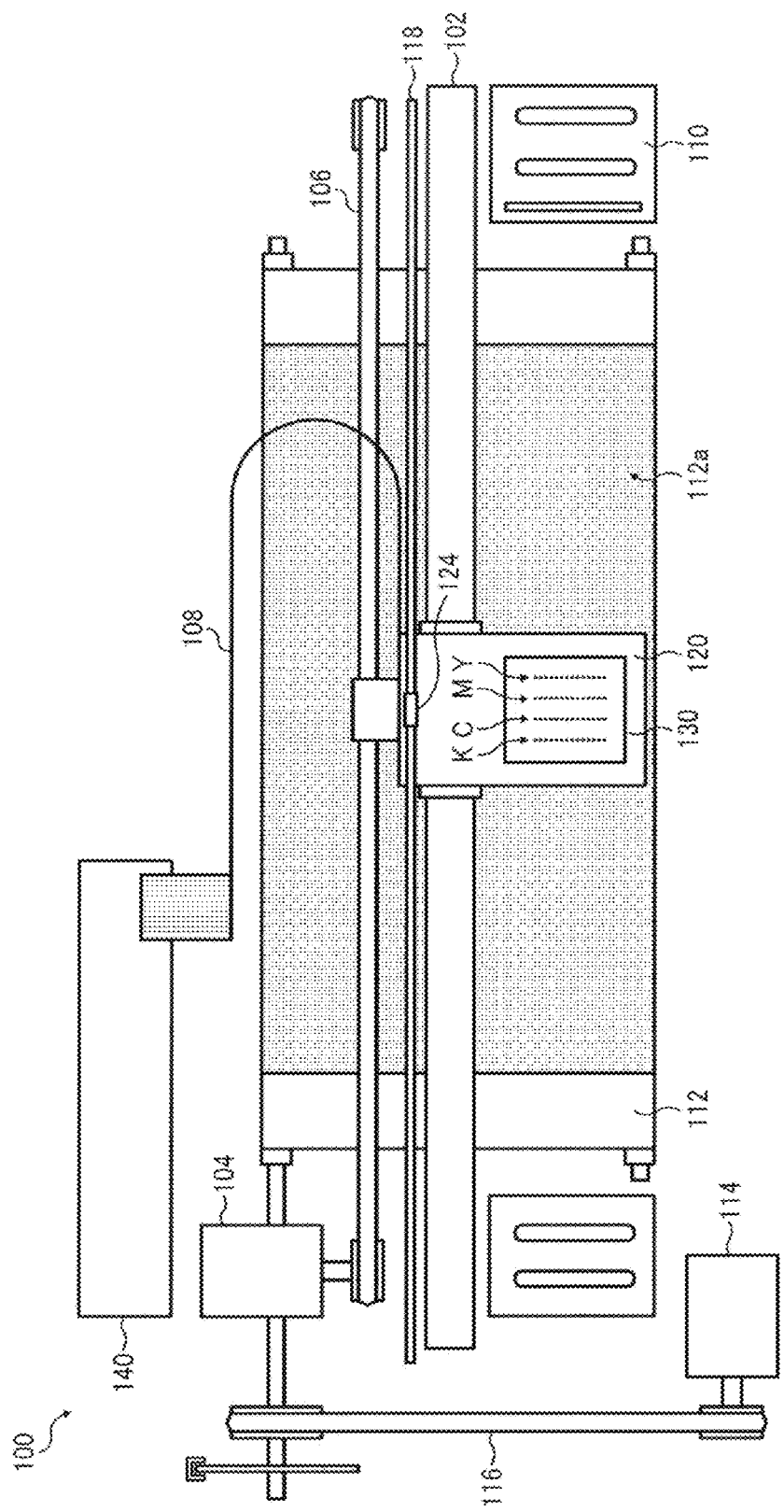
FIG. 1 is a diagram illustrating an inkjet printer as a first embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the technique described in JP-2010-120181-A, while the corruption of data by the noise generated in the switching can be prevented, it is still possible that the generated noise affects data signals and clock signals. That is, even if data transfer is stopped, the signal levels of the data and clock can be changed unexpectedly due to the noise, and it is still possible that the head receives the wrong transferred data.

First Embodiment

In the following embodiment, a recording apparatus is provided that includes an operational unit that accepts input, such as inputting a command and an operating unit that executes processing information based on the input, such as the command accepted by the operational unit.

In this configuration, in the recording apparatus, even if signals in signal lines that transfer recording data to a head unit due to operation of a switching unit in the head unit and unintentional data is transferred to the head, it is possible to reduce that effect.

FIG. 1 is a diagram illustrating an inkjet printer 100 as a first embodiment of the present invention. The inkjet printer 100 shown in FIG. 1 includes a carriage 120, a head 130 included in the carriage 120, and a control unit 140 connected to the head 130 as main component units. The head 130 on the carriage 120 and the control unit 140 physically separated from the head 130 on the carriage 120 are connected with a flat flexible cable (FFC) 108.

The carriage 120 is held by a guide rod 102 that consists of a carriage mechanism, and motive energy is conveyed to the carriage 120 by a main scanning motor 104 via a pulley mechanism 106 bridged between the carriage 120 and the main scanning motor 104. As a result, the carriage 120 is scanned in the main scanning direction along with the guide rod 102 in response to driving by the main scanning motor 104. A position of the carriage 120 can be acquired by reading a pattern recorded on an encoder sheet 118 mounted on the case at even intervals by a main scanning encoder sensor 124 mounted on the carriage 120 along with moving and adding/subtracting counts.

Piezoelectric devices as driving units (actuators) corresponding to nozzles that discharge ink droplets is included in the head 130 mounted on the carriage 120, and pairs of the nozzles and the piezoelectric devices constructs ink channels. In the inkjet printer 100, the piezoelectric devices are driven by conveying recording data, control signals, and driving signals from the control unit 140 to the piezoelectric devices in the head 130. Subsequently, by transforming a pressure chamber wall of the ink channel in accordance with driving the piezoelectric device, the ink droplet is discharged from the nozzle.

On the head 130 mounted on the carriage 120, for example, nozzle rows that discharge the ink droplets in black (K), cyan (C), magenta (M), and yellow (Y) are mounted. By moving the carriage 120 in the main scanning direction and discharging the ink droplets from the nozzle rows K, C, M, and Y laid out on the head 130 at necessary positions, an image is formed on a recording medium.

In performing printing, the carriage 120 reaches a drawing zone 112a accelerating from outside of the drawing zone 112a and instructs the nozzle row that reaches the drawing zone 112a to discharge the ink droplets sequentially. For example, if the carriage 120 that accelerates from a retracting zone 110 located on the right of the drawing zone 112a in the left direction in FIG. 1 reaches the drawing zone 112a, each nozzle row starts discharging the ink droplets in order of K, C, M, and Y sequentially.

After moving the carriage in the main scanning direction and discharging the ink droplets described above once, an image is formed on a band whose width is the same as the nozzle row. After finishing forming the image for one band, motive energy is conveyed to a roller by driving a sub-scanning motor 114 via a pulley mechanism 116, the recording medium absorbed to an electrostatic absorption belt 112 is transferred in the sub-scanning direction, and another image for one band is formed. By repeating the process described above, an image is formed at a predetermined location on the recording medium.

Figure 2:
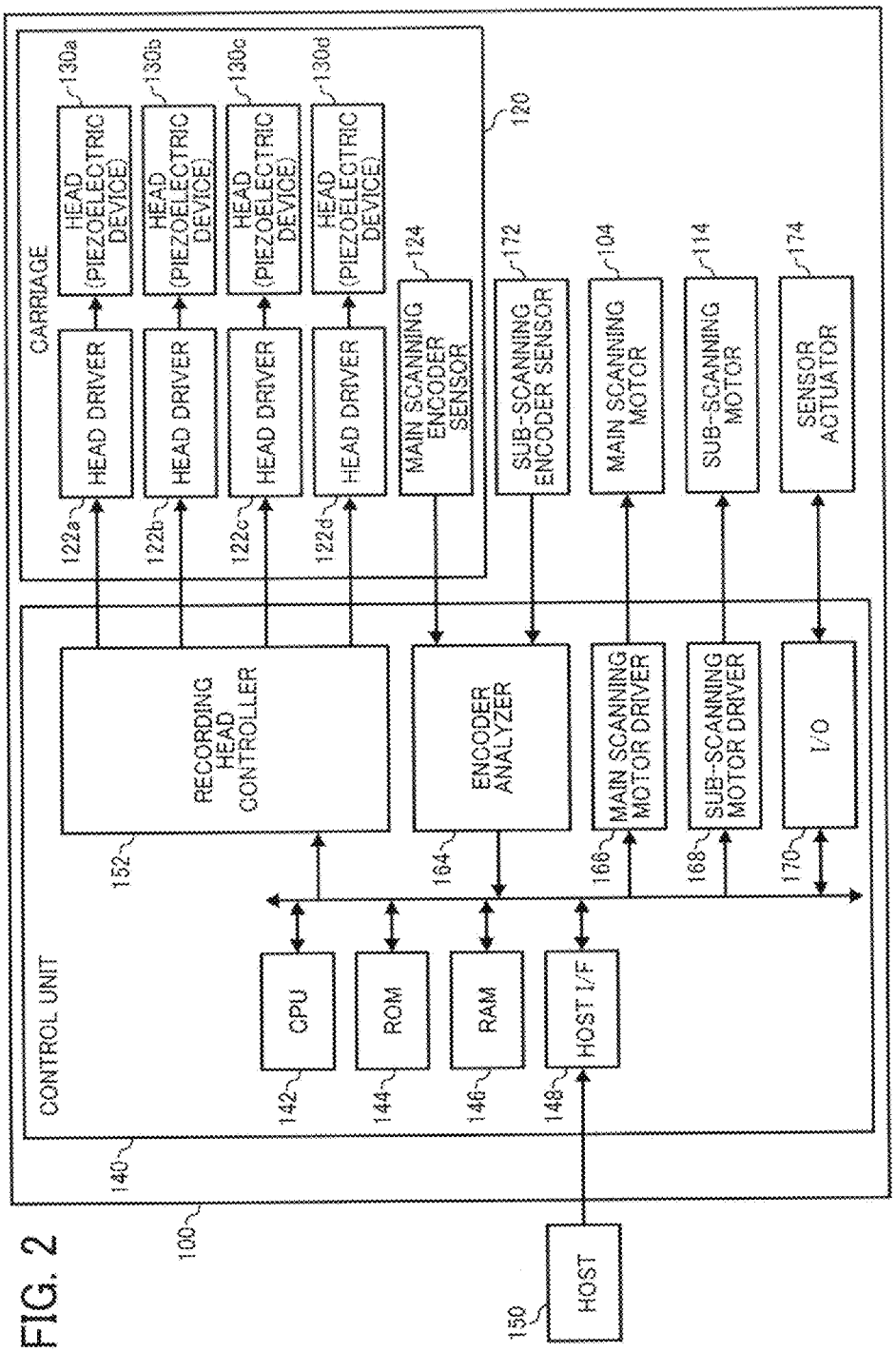
FIG. 2 is a block diagram illustrating a hardware configuration of the inkjet printer as the first embodiment of the present invention.

FIG. 2 is a block diagram illustrating a hardware configuration of the inkjet printer in this embodiment. The inkjet printer 100 shown in FIG. 2 consists of components in the control unit 140 and components in the carriage 120.

The control unit 140 includes a CPU 142, a ROM 144, a RAM 146, a host interface (I/F) 148, a recording head controller 152, an encoder analyzer 164, a main scanning motor driver 166, a sub-scanning motor driver 168, and an input/output unit (I/O) 170. The carriage 120 includes multiple head drivers from 122a to 122d, multiple heads from 130a to 130d, and a main scanning encoder sensor 124. The head driver 122 drives the corresponding head 130 based on a driving signal input from the control unit 140. The main scanning encoder sensor 124 measures moving distance of the carriage (scanning position) and outputs the measuring result to the encoder analyzer 164.

The I/O 170 described above is connected to various sensors such as a resist sensor, a temperature sensor, and paper feeding sensor located in the inkjet printer 100 and the actuator. The main scanning motor driver 166 outputs a signal to drive the main scanning motor 104, and the sub-scanning motor driver 168 outputs a signal to drive the sub-scanning motor 114. By controlling the operation of the main scanning motor 104 and the sub-scanning motor 114, it is realized to scan in the main scanning direction and the sub-scanning direction.

The encoder analyzer 164 is connected to the main scanning encoder sensor 124 and the sub-scanning encoder sensor 172, analyzes signals output by each encoder, and abstracts the main scanning position, sub-scanning position, and velocities in each scanning direction. The recording head controller 152 performs various controls regarding printing and outputting, generates the driving signals that include predetermined waveforms to drive the piezoelectric devices on the head 130 described above, and outputs the signal to each of the head drivers 122.

A typical printing operation of the inkjet printer 100 can be implemented by receiving a print job that the host 150 transfers by the host I/F 148 and controlling an image process that generates image data and mechanical control that controls motors cooperatively. In processing the image, under the control of the CPU 142, the control unit 140 generates the image data to be printed by analyzing the received print job and expanding the image into the RAM 146. In controlling the mechanisms, with analyzing output from the main scanning encoder sensor 124 by the encoder analyzer 164, the control unit 140 controls the scanning motors 104 and 114 by the motor drives 166 and 168.

In conjunction with the position of the carriage 120 acquired from the main scanning encoder sensor 124, the recording head controller 152 transfers the image data stored in the RAM 146, the driving waveforms and control signals stored in the ROM 144 to each of the head drivers 122. Based on the data transferred by the recording head controller 152, the head driver 122 drives the head 130 and instructs the head 130 to discharge the ink droplets. By performing the cooperative control described above, it is possible to decide the position of the head 130 against the recording medium, discharge the ink droplets from the nozzles in accordance with the image data, and land the ink droplets of intended sizes at intended landing positions. Here, the recording head controller 152 functions as a recording data transmitter.

As described above, the recording head controller 152 generates the driving signal to drive the piezoelectric devices. Representatively, the waveforms of the driving signal is selected and used among multiple waveform types in accordance with a printing mode (specifying speed-oriented mode or quality-oriented mode) or type of the recording medium (specifying standard paper or gloss paper). In selecting waveforms, the CPU 142 selects the driving waveform data among multiple driving waveform data that is stored in the ROM 144 and defines each of the waveforms in accordance with the request by the received print job. After selecting the driving waveform data, the CPU 142 transfers the corresponding driving waveform data to the recording head controller 152.

Figure 3:
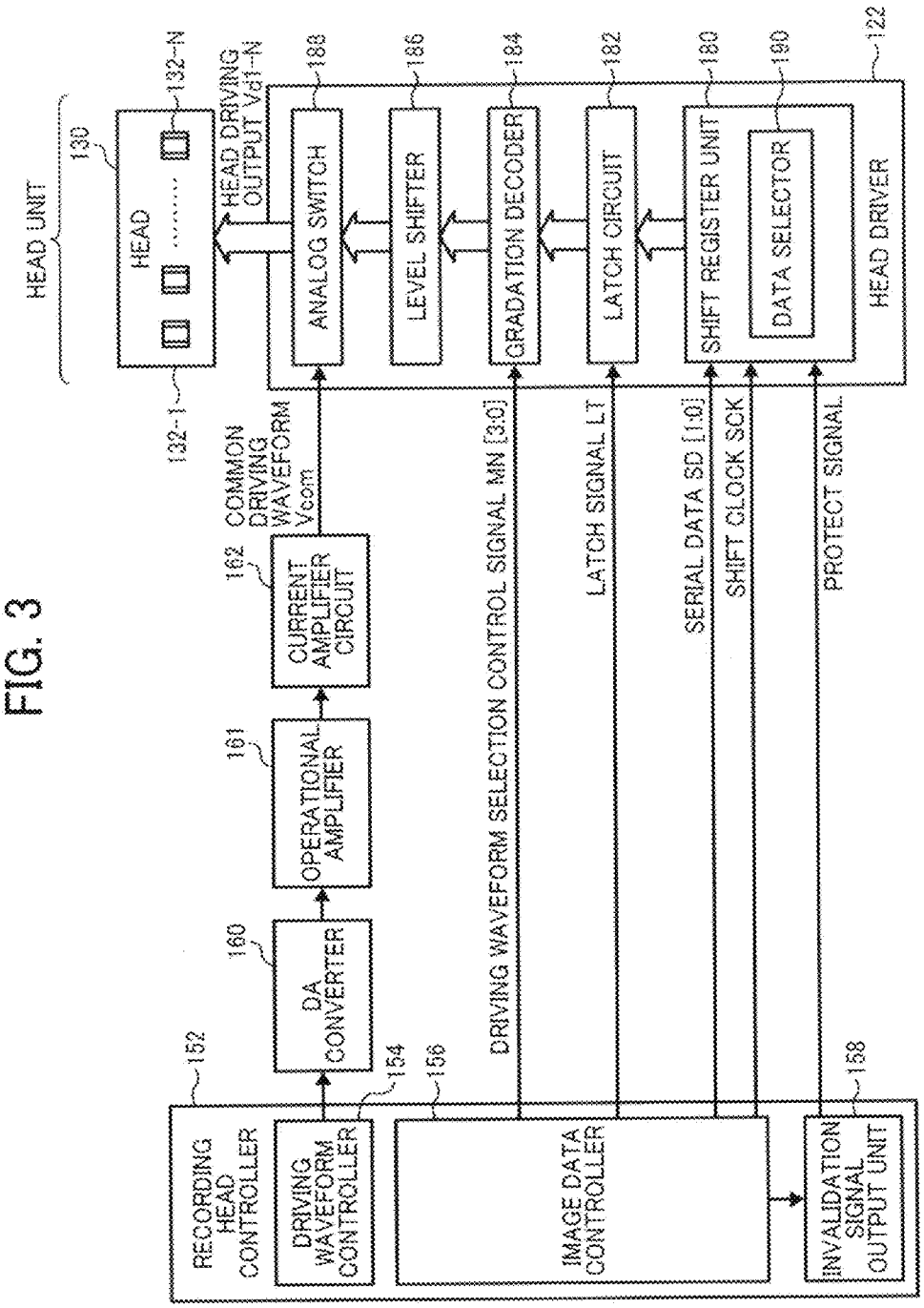
FIG. 3 is a diagram illustrating signal flow from outputting a driving signal and transferring recording data to driving a piezoelectric device in a head as the first embodiment of the present invention.

FIG. 3 is a diagram illustrating signal flow from outputting the driving signal and transferring the recording data to driving the piezoelectric device in the head in this embodiment. More specifically, the recording head controller 152 includes a driving waveform controller 154, an image data controller 156, and an invalidation signal output unit 158.

First, after inputting the selected driving waveform data, the driving waveform controller 154 forms the waveform data and outputs it to a DA converter 160. The DA converter 160 converts the digital waveform data into an analog voltage signal. Subsequently, an operational amplifier 161 amplifies the voltage signal. After being amplified by a current amplifier circuit 162, the signal amplified by the operational amplifier 161 is transferred to the head drivers 122 via the FFC 108. This transferred signal is a common signal to drive the piezoelectric device and hereinafter referred to as "common driving waveform Vcom".

The image data controller 156 in the recording head controller 152 outputs image serial data[1:0] (hereinafter referred to as recording data), shift clock SCK, latch signal LT, and driving waveform selection control signal MN[3:0] to the head drivers 122. The head drivers 122 include a shift register 180, a latch circuit 182, a gradation decoder 184, a level shifter 186, and an analog switch 188. The head 130 includes N ink channels that include the nozzle and the piezoelectric device 132 respectively and can discharge the ink droplets in multiple gradations (e.g., four gradations) including not discharging the ink droplets. In this embodiment, the recording data transfer unit consists of the recording head controller 152, and the head unit consists of the head driver 122 and the head 130.

After receiving the recording data SD[1:0] from the image data controller 156 via the data signal lines, the shift register 180 transfers it at the edge of the clock SCK. The latch circuit 182 latches the data output from the shift register 180 at the edge of the latch signal LT. The gradation decode 184 decodes the recording data and the driving waveform selection control signal MN and output the decoding result data. The level shifter 186 converts the logic level voltage signal from the gradation decoder 184 into level that can operate the analog switch 188. Opening/closing the analog switch 188 is controlled by the output of the gradation decoder 184 based on the recording data via the level shifter 186. Here, the analog switch 188 functions as a switching unit.

By controlling opening/closing the analog switch 188 by the gradation decoder 184 via the level shifter 186 based on the driving waveform selection control signal MN, gradation waveform corresponding to gradation value is selected from among the common driving waveform Vcom, and head driving outputs from Vd1 to VdN is output. By applying the head driving outputs from Vd1 to VdN to the driving device 132, each of the piezoelectric devices from 132-1 to 132-N is transformed, and the ink droplets are discharged from each of the nozzles.

In this case, due to switching the analog switch 188 in the head driver 122, it is possible to generate noise in power supply voltage and ground. As a result, if big noise is generated during transferring the recording data and signals of the recording data SD and the clock SCK are affected largely, it is possible that the bit values of the recording data become wrong value and appropriate discharge of the ink droplets cannot be performed.

To cope with this problem, the image data controller 156 in this embodiment stops transferring the recording data temporarily, i.e., outputting in the signal lines of the recording data SD and the clock SCK, in switching the analog switch 188 described above.

Figure 4:
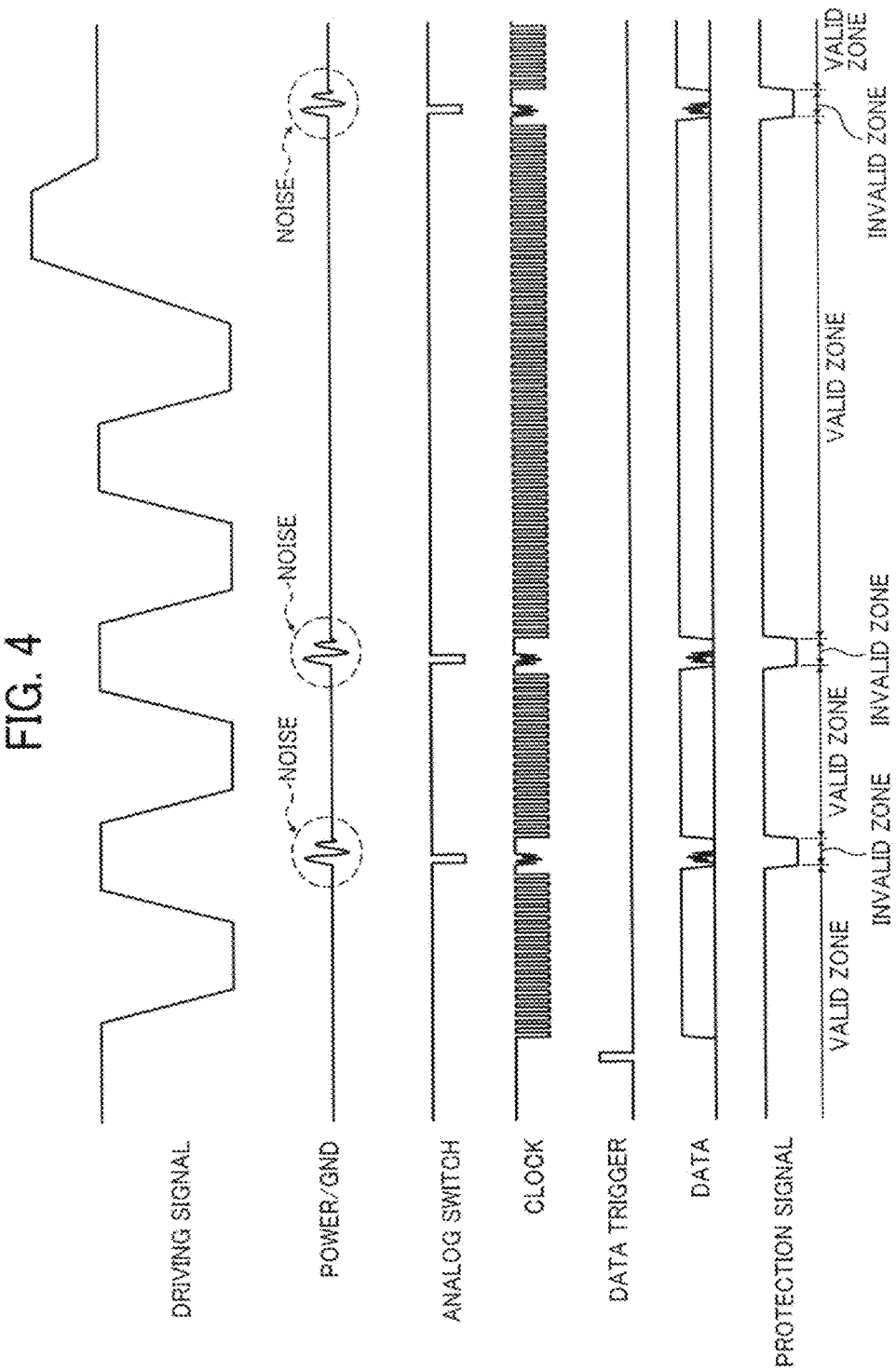
FIG. 4 is a timing chart illustrating various signals in a head unit and a recording head controller as the first embodiment of the present invention.

FIG. 4 is a timing chart illustrating various signals in the head unit and the recording head controller in this embodiment. In FIG. 4, noise is generated in the power supply voltage and ground in timing of switching the analog switch 188. However, because of the control that stops transferring the recording data temporarily as described above, error due to the effect of the noise is prevented from getting mixed in the transferred recording data itself.

While it is stopped to transfer the recording data, signals of the recording data SD and the clock SCK is kept inputting to the shift register 180. In this case, if the noise is generated in the power supply voltage and ground described above, regardless of not transferring the data, it is possible to input redundant wrong data.

In FIG. 4, since the noise is generated in the power supply voltage and ground in the timing of switching analog switch 188, disturbance in signal level of the recording data SD and the clock SCK while it is stopped to transfer the recording data. As described above, it is possible to change the signals of the recording data SD and the clock SCK unintentionally due to the noise of the power supply voltage and ground. As a result, regardless of stopping transferring the recording data, it is possible to transfer wrong redundant data to the shift register 180 as if the edge of the clock rises.

To cope with this problem, the invalidation signal output unit 158 shown in FIG. 3 outputs an invalid data identification signal (protection signal) that indicates that it is stopped to transfer the recording data temporarily to the head driver 122. As shown in FIG. 4, the invalid data identification signal partitions the signals of the recording data SD and the clock SCK into valid period in which the recording data is transferred and invalid period in which the recording data is not transferred. Here, invalidation signal output unit 158 functions as a partition signal output unit.

The invalid data identification signal does not vary frequently just like the recording data SD and the clock SCK Therefore, in a preferable embodiment, it is possible to make driving capability of the invalid data identification signal higher than the recording data SD and the clock SCK described above. Consequently, it is possible to reduce the effect of the noise described above in the invalid data identification signal.

The shift register 180 in this embodiment includes a data selector 190. Based on the invalid data identification signal described above, the data selector 190 chooses data based on the signal input via the signal lines of the recording data SD and the clock SCK. More specifically, in response to the invalid data identification signal whose signal level indicates the invalid period, the data selector discards data received during that period.

By adopting the configuration described above, it is possible to ignore wrong redundant data received while it is stopped to transfer the data due to the noise. Consequently, even if the signal level of the data and clock changes unexpectedly due to the generated noise described above, it is possible to prevent the error from mixing in while it is stopped to transfer the data.

As described above, in the first embodiment, while it is stopped to transfer the recording data in accordance with switching of the analog switch 188, the head drivers 122 discards the data based on the invalid data identification signal. Consequently, even if the signal of the recording data SD and the clock SCK changes unexpectedly due to the generated noise described above, the head drivers 122 can receive the transferred data correctly. As a result, it is possible to prevent the image from deteriorating due to the mixed wrong redundant data preferably.

Second Embodiment

In the first embodiment described above, the configuration that outputs the invalid data identification signal is adopted in order to cope with the problem due to the noise generated by switching the analog switch. The second embodiment that can cope with the problem due to the noise generated by switching the analog switch is described below with reference to FIGS. from 5 to 7. Since the inkjet printer 100 in this embodiment includes the same configuration as shown in FIGS. 1 and 2, the difference between the first embodiment and the second embodiment is mainly described below with reference to FIGS. from 5 to 7.

Figure 5:
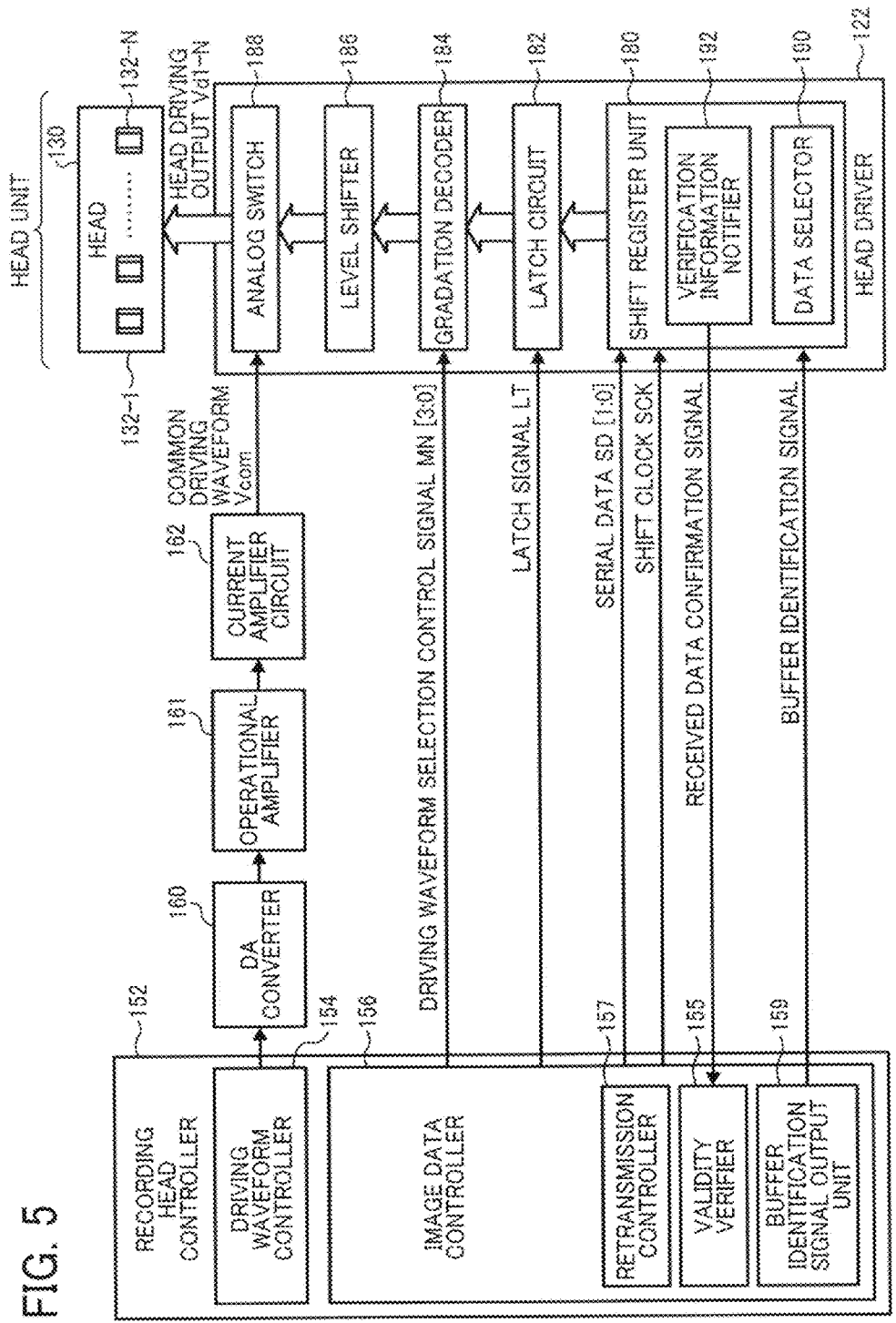
FIG. 5 is a diagram illustrating signal flow from outputting the driving signal and transferring recording data to driving the piezoelectric device in the head as a second embodiment of the present invention.

FIG. 5 is a diagram illustrating signal flow from outputting the driving signal and transferring the recording data to driving the piezoelectric device in the head in this embodiment. The recording head controller 152 in this embodiment includes the driving waveform controller 154 and the image data controller 156. The image data controller 156 includes a validity verifier 155, a retransmission controller 157, and a buffer identification signal output unit 159. Here, the validity verifier 155 functions as a determination unit, and the retransmission controller 157 functions as a retransmission control unit.

The buffer identification signal output unit 159 shown in FIG. 5 outputs a buffer identification signal to the head driver 122. In this embodiment, the shift register unit 180 included in the head driver 122 includes multiple buffers (described later in detail), and the buffer to store data temporarily is selected from those buffers. The buffer identification signal described above partitions the signals of the recording data SD and the clock SCK into periods to be stored in each of the buffers and identifies the buffer that stores each period.

The buffer identification signal does not vary frequently just like the recording data SD and the clock SCK Therefore, in a preferable embodiment, it is possible to make driving capability of the buffer identification signal higher than the recording data SD and the clock SCK described above. Consequently, it is possible to reduce the effect of the noise described above in the buffer identification signal.

The shift register unit 180 in this embodiment includes the data selector 190 and a verification information notifier 192. Based on the buffer identification signal described above, the data selector 190 chooses data input via the signal lines. The verification information notifier 192 reports verification information to confirm validity of the received data in switching the analog switch 188 as a received data confirmation signal to the image data controller 156. Here, the verification information notifier 192 functions as a notifier.

The verification information verifies the validity of the data stored in the buffer identified as the storing destination by the buffer identification signal. The verification information is not limited to specific one as long as the image data controller 156 can verify the validity of the data stored in the buffer. For example, the verification information can be whole data stored in the buffer, or error detection codes such as check sum, cyclic code, and hash value calculated from the data can be used as the verification information.

Based on the reported verification information, the validity verifier 155 determines whether or not the transferred recording data to be stored in the corresponding buffer corresponds to the data stored in the corresponding buffer. Since the image data controller 156 grasps which data is transferred to which buffer, the transferred recording data to be verified can be acquired easily. After comparing the verification information calculated from the transferred recording data (e.g., check sum) with the reported verification information (e.g., check sum), if they match, it is highly possible that the recording data is transferred correctly. By contrast, if the verification information does not match, it is suggested that the error mixed in the recording data.

After receiving the determination result described above, if the validity verifier 155 determines that they match, the image data controller 156 resumes transferring the following recording data. If it is determined that they do not match, the retransmission controller 157 instructs to retransfer the recording data whose size is the buffer capacity including the recording data that has been transferred already. In response to the retransferred recording data whose size is the buffer capacity, the data selector 190 discards the data that the error mixed in by overwriting the prior data that the error mixed in.

Figure 6:
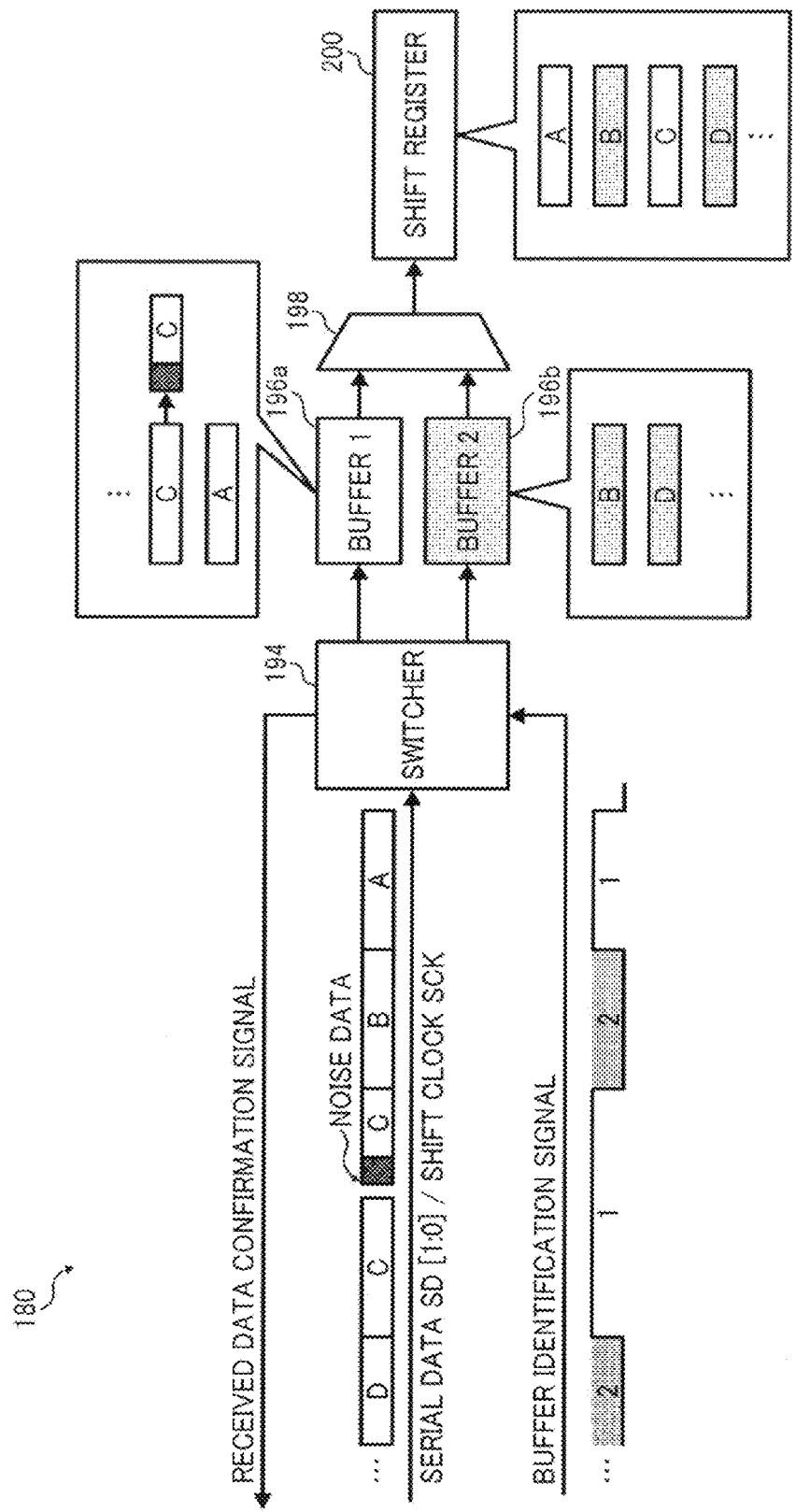
FIG. 6 is a diagram illustrating a detailed configuration of a shift register unit and data flow as the second embodiment of the present invention.

FIG. 6 is a diagram illustrating a detailed configuration of the shift register unit 180 and data flow in this embodiment. As shown in FIG. 6, the shift register unit 180 includes a switcher 194 that selects output destination in accordance with the buffer identification signal, multiple buffers 196 as the output destination of the switcher 194 respectively, a selector 198, and a shift register 200. The selector 198 reads data from the buffer that becomes full among the multiple buffers 196 and outputs it to the shift register 200. In this embodiment, the storing destination is selected from two buffers 196a and 196b in accordance with the buffer identification signal.

In the first embodiment, the shift register unit 180 in the head unit stores the transferred recording data SD synchronized with the clock SCK as is sequentially. By contrast, in the second embodiment, in the shift register unit 180 in the head unit, the multiple buffers 196 buffer data temporarily in the previous step of the shift register 200. Since the image data controller 156 grasp the transferred data size, the buffer identification signal output unit 159 outputs the buffer identification signal to switch to the other buffer in the timing when the buffer becomes full in accordance with the buffer capacity.

After switching to the other buffer, the full buffer ejects the stored data by transferring the recording data that the buffer stores in it to the shift register 200 via the selector 198.

As shown in FIG. 6, if the recording data A, B, C, and D is input to the switcher 194 as the recording data, the switcher 194 distributes each recording data to the buffer 196 as the storing destination in accordance with the buffer identification signal. In FIG. 6, the data A and c are distributed to the buffer 1, and the data B and D are distributed to the buffer 2.

In this case, if the noise data is generated due to the noise described above, data is input to the buffer currently selected beyond its capacity. However, since the image data controller 156 grasps the transferred data size, the buffer is switched not in the timing when the buffer becomes full including the redundant data but in the timing of finishing transferring data whose size is the buffer capacity.

Regularly, the wrong data due to the noise while it is stopped to transfer the data is mixed in the correct data. Therefore, once the wrong data is mixed in, the following data originally correct is transferred to the wrong position in the shift register 200, and that can affect the whole part. By contrast, in the second embodiment, since the temporary storing destination is switched for each buffer capacity, the correct recording data is always input to the switched buffer from the top. Therefore, even if the wrong data due to the noise is mixed in the buffer, the recording data transferred at least to the previous buffer and the following buffer is sent to the correct position in the shift register 200. Consequently, the garbled data is limited within the buffer that the wrong data is mixed in, and it does not affect to other buffers.

In addition, in order to verify the validity of the data stored in the buffer 196 in the timing of switching the analog switch 188, the switcher 194 generates the verification information described above and reports it to the image data controller 156 as a received data confirmation signal. The switcher 194 shown in FIG. 6 corresponds to the verification information notifier 192 shown in FIG. 5.

As described above, upon confirming the validity based on the reported verification information, the image data controller 156 keeps transferring the following data subsequently. By contrast, upon not confirming the validity based on the reported verification information, the image data controller 156 replaces data stored in the buffer with correct data by transferring the data to be stored in the buffer over again.

The buffer 196 consists of a memory, e.g., so-called First In First Out (FIFO). Upon retransferring the correct data to the buffer 196 for the size of the buffer, data that is transferred previously and includes redundant wrong data is discarded by being pushed out and replaced with the correct data.

For example, in the case shown in FIG. 6, in switching the analog switch 188, wrong data (shown in black) is mixed in the timing of halfway of data "C" due to the generated noise. In that case, in confirming the received data, it is detected that the wrong data is mixed, and the whole part of the data "C" is retransferred. As a result, in the buffer 1, the data "C" (that includes the black part) that includes the existing wrong part is replaced with the correct data "C" by being pushed out by the retransferred correct data "C"

In transferring the recording data normally, since it is guaranteed to transfer the data and designed so that the possibility of mixing the wrong data is quite low, the possibility of receiving the wrong data is low. By contrast, in the timing of generating noises due to switching of the analog switch 188, the clock and data signal can be changed due to the effect of the noise unexpectedly in some cases. Therefore, in the preferable embodiment, after switching the analog switch 188, it is effective to confirm the received data described above on the data stored in the buffer transferred just prior to the switch of the analog switch 188.

FIG. 7 is a timing chart illustrating various signals in the head unit and the recording head controller 152 in the second embodiment. As shown in FIG. 7, in the preferable embodiment, the image data controller 156 stops transferring the recording data once in the timing of after switching the analog switch 188. In this case, the switcher 194 calculates the verification information from the data stored in the buffer currently selected and reports it to the image data controller 156 as the received data confirmation signal. If it is determined that the wrong data is included in the data stored in the buffer 196, the image data controller 156 retransfers the data to be stored in the buffer. In retransferring the data, as shown in FIG. 7, the period of the buffer identification signal becomes longer for the time of retransferring the data. Here, image data controller 156 functions as a transfer controller.

As shown in FIG. 7, in the second embodiment, since it is confirmed whether or not the transferred data is correct, it is possible to detect the wrong data even in the period of switching the analog switch 188 when the noise is prone to be generated. Therefore, it is unnecessary to stop transferring the recording data as described above. Since the wrong data is not received actually even in the period when the wrong data is prone to be generated due to the generated noise, it is possible to keep transferring the data consecutively. Consequently, in the second embodiment, the period when the data is transferred becomes longer by not stopping transferring the recording data, and that can improve the transfer rate.

By contrast, in the case of the system that attaches a high value to certainty rather than improving the data transfer rate, it is possible to stop transferring the data or ignore the change of the signal by using the invalid data identification signal in the timing when the noise is prone to be generated as described in the first embodiment.

By adopting the configuration described above, if the wrong data due to the switch of the analog switch is input, it is possible to discard the wrong data and request to retransfer the data. Consequently, if the signal level of the data and clock is changed unexpectedly due to the generated noise, it is possible to circumvent the problem by mixing the wrong data while it is stopped to transfer the recording data preferably.

In the second embodiment described above, in coping with the noise due to the switch of the analog switch 188, the head driver 122 confirms the data based on the buffer identification signal described above and discards the wrong data if necessary. As a result, if the signal of the recording data SD and the clock SCK is changed unexpectedly due to the noise, the head driver 122 can ignore the wrong data. Consequently, it is prevented that the wrong data is mixed in and the image quality becomes deteriorated preferably.

In the second embodiment described above, the data capacity referred upon confirming the received data is the capacity of the buffer. However, in other embodiments, it is possible that the capacity of the buffer is variable and a configuration unit that configures the data size stored in the buffer is included.

In the embodiment described above, if the signal in the signal line that transfers the recording data to the head unit is affected by the noise due to the switch of the switching unit in the head unit and the unexpected data is transferred to the head, it is possible to reduce the effect.

In the embodiments described above, the inkjet printer 100 is used as the example of the inkjet apparatus. However, the inkjet apparatus is not limited to the printer and can be other image forming apparatuses that use the inkjet method and include image forming capabilities such as copier function and fax function. In addition, in the embodiments described above, "drawing" means that an image is formed by discharging the ink droplets that include color material such as colorant and dyestuff on the recording medium. However, it is not limited to that. In other embodiments, the present invention can be applied to any apparatus that includes the inkjet mechanism that draws intended pattern by discharging ink droplets that includes organic, inorganic, or metal conductive material, semiconductor material, insulation material, luminous material, carrier transport material, dyestuff material, and DNA other than ink that includes color material at appropriate positions on a base material such as paper, glass, resin, and cloth. Regarding the inkjet method, as long as performing the effects described above, it is not limited to the piezoelectric method that uses the piezoelectric device as the driving unit.

The functional units described above can be implemented by a computer-executable program written in legacy programming languages such as Assembler, C, C++, C#, and Java or object oriented programming languages. The program can be distributed by storing in a machine-readable recording medium such as ROM, EEPROM, EPROM, flash memory, flexible disk, CD-ROM, CD-RW, DVD-ROM, DVD-RAM, DVD-RW, Blu-ray disk, SD card, and MO or via an electric communications line. The whole part or a part of the functional units described above can be implemented, for example, on a programmable device (PD) such as a Field Programmable Gate Array (FPGA) or as an Application Specific IC (ASIC), and that can be distributed by using the recording medium that stores circuit configuration data downloaded to the PD to implement the functional units described above (bit stream data) and data written in Hardware Description Language (HDL), Very High Speed Integrated Circuits (VHSIC) Hardware Description Language (VHDL) for generating the circuit configuration data.

The present invention also encompasses a recording medium storing a program that executes a recording apparatus control method, performed by a recording apparatus that includes a head unit, which includes a driver, and a recording data transmitter that transfers recording data to the head unit via a signal line. The recording apparatus control method, performed by the recording apparatus, includes the steps of switching a driving signal applied to the driver between conductive and nonconductive states based on the transferred recording data using the head unit, outputting from the recording data transmitter a partition signal that partitions a data signal of the recording data to the head unit in response to switching by the switching unit, and selecting data to be discarded from the transferred recording data based on the partition signal using the head unit.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. A recording apparatus, comprising:
   a head unit including a driver to drive a recording head;
   a recording head controller to output a drive signal to the driver to control operation of the head unit;
   a recording data transmitter provided in the recording head controller to transfer recording data to the head unit via a signal line;
   a switching unit provided in the head unit to switch the drive signal applied to the driver between conductive and nonconductive states based on the transferred recording data;
   a partition signal output unit provided in the recording data transmitter to output an invalid data identification signal that partitions a data signal of the recording data to the head unit, in response to switching by the switching unit; and
   a data selector provided in the head unit to select data to be discarded from the transferred recording data based on the invalid data identification signal.

2. The recording apparatus according to claim 1, wherein:
   the partition signal output unit outputs the invalid data identification signal that partitions the data signal into a valid period in which the recording data is transferred and an invalid period in which the recording data is not transferred; and
   the data selector discards data based on the data signal corresponding to the invalid period in switching the switching unit based on the invalid data identification signal.

3. The recording apparatus according to claim 2, wherein the partition signal output unit outputs a buffer identification signal that partitions the data signal into periods in which the recording data to be stored in buffers in the head unit and identifies a buffer that is to store the recording data as a destination buffer.

4. The recording apparatus according to claim 3, wherein the head unit further comprises a notifier to report, to the recording data transmitter, verification information that verifies validity of data stored in the destination buffer based on the buffer identification signal output by the partition signal output unit.

5. The recording apparatus according to claim 4, wherein the recording data transmitter further comprises:
   a determination unit to determine whether or not the recording data already transferred and to be stored in a corresponding buffer matches data stored in the corresponding buffer; and
   a retransmission control unit to retransfer the recording data including the data already transferred in response to determining that the recording data already transferred to be stored does not match the data stored in the corresponding buffer,
   wherein the data selector discards existing data that includes redundant data from the buffer in response to input of the retransferred recording data.

6. The recording apparatus according to claim 5, wherein the recording data transmitter resumes transferring the recording data subsequent to the recording data already transferred when the determination unit determines that the recording data already transferred and to be stored matches the data stored in the corresponding buffer.

7. The recording apparatus according to claim 3, further comprising a configuration unit to configure a data size that specifies timing of confirming received data based on verification information.

8. The recording apparatus according to claim 1, wherein the recording data transmitter further comprises a transfer controller to stop transferring the recording data and outputting a clock temporarily in switching the switching unit.

9. A recording apparatus control method executed by a recording apparatus that includes a head unit, which includes a driver, and a recording data transmitter to transfer recording data to the head unit via a signal line, comprising:
   switching with the head unit a driving signal applied to the driver between conductive and nonconductive states based on the transferred recording data;
   outputting from the recording data transmitter an invalid data identification signal that partitions a data signal of the recording data to the head unit, in response to switching by a switching unit; and
   using the head unit, selecting data to be discarded from the transferred recording data based on the invalid data identification signal.

* * * * *